United States Patent
Lamb

[19]

[11] Patent Number: 5,880,548
[45] Date of Patent: Mar. 9, 1999

[54] ADJUSTABLE MAGNETIC COUPLER

[75] Inventor: Karl J. Lamb, Port Angeles, Wash.

[73] Assignee: Magna Force, Inc., Port Angeles, Wash.

[21] Appl. No.: 803,365

[22] Filed: Feb. 20, 1997

Related U.S. Application Data

[63] Continuation-in-part of Ser. No. 546,066, Oct. 20, 1995, Pat. No. 5,668,424, which is a continuation of Ser. No. 237,031, May 3, 1994, Pat. No. 5,477,094, which is a continuation-in-part of Ser. No. 65,867, May 21, 1993, Pat. No. 5,477,093.

[51] Int. Cl.$^6$ .......................... H02K 49/00; H02D 15/00
[52] U.S. Cl. ................. 310/103; 310/75 D; 310/75 R; 310/77; 310/78; 310/92
[58] Field of Search .............................. 310/75 D, 75 R, 310/92, 103, 105, 72, 78; 192/80, 94

[56] References Cited

U.S. PATENT DOCUMENTS

| | | | |
|---|---|---|---|
| 3,579,003 | 5/1971 | Gray | 310/93 |
| 3,659,126 | 4/1972 | Whipker | 310/92 |
| 4,152,617 | 5/1979 | Janson | 310/103 |
| 4,163,914 | 8/1979 | Keyes | 310/103 |
| 4,826,150 | 5/1989 | Minoura | 272/73 |
| 5,650,679 | 7/1997 | Boggs, III et al. | 310/105 |

*Primary Examiner*—Elvin G. Enad
*Attorney, Agent, or Firm*—Seed and Berry LLP

[57] ABSTRACT

An adjustable coupler has a group of magnet rotors separated by air gaps from a group of conductor rotors. The air gaps are adjusted by axial movement of one of the groups relative to the other to vary the slip of the coupler and achieve a constant load speed at various load torques.

12 Claims, 10 Drawing Sheets

ADJUSTABLE MAGNETIC COUPLER

CROSS-REFERENCES TO RELATED APPLICATION

This application is a continuation-in-part of my application Ser. No. 08/546,066, filed Oct. 20, 1995, now U.S. Pat. No. 5,668,424, which is a continuation of U.S. Ser. No. 08/237,031, filed May 3, 1994, now U.S. Pat. No. 5,477,094, in turn a continuation-in-part of Ser. No. 08/065,867, filed May 21, 1993, now U.S. Pat. No. 5,477,093.

TECHNICAL FIELD

The present invention relates to permanent magnet couplers of the type having a magnet rotor on one shaft spaced by an air gap from a conductor rotor on another shaft, the conductor rotor having a ferrous-backed electroconductive element located opposite magnets presented by the magnet rotor. More particularly, the invention relates to adjustment of the air gap.

BACKGROUND OF THE INVENTION

Induction motors are used, for example, to drive fans, blowers, pumps and compressors. It has been recognized that when these motors are operated at full speed they normally have excess capacity as compared to the load requirements, and this excess capacity is compounded when the load is variable. It has also been recognized that if the output of the motors could be adjusted to provide only the needed power, a significant reduction of energy usage would result. Hence, variable speed drives (VSD's) have been developed in the form of electronic devices which match motor speed to that required for a given application. A typical VSD rectifies incoming AC voltage and current into DC, then inverts the DC back to AC at a different voltage and frequency. The output voltage and frequency is determined by the actual power needs and is set automatically by a control system or by an operator.

Heretofore, VSD's have generally been so expensive that they have not been used extensively for energy savings. It has been reported that VSD's require the availability of highly trained maintenance personnel and shorten motor life.

SUMMARY OF THE INVENTION

The present invention aims to provide a mechanical alternative to VSD's which is far more economical, will automatically maintain the speed of the load to a preset speed as the load requirements vary, and will not require modification of the electric motor or adjustment of the input voltage or frequency. A further object is to provide a permanent magnet coupling which will function in place of VSD's without overheating.

In my prior U.S. Pat. No. 5,477,094 there is shown a magnetic coupler in which a magnet rotor unit is straddled by two conductor rotors which are connected together to rotate as a conductor rotor unit on one shaft while the magnet rotor unit is mounted to rotate on a second shaft. The magnet rotor unit has a set of permanent magnets arranged with their opposite poles spaced by air gaps from ferrous-backed electroconductive rings mounted on respective of the conductor rotors. Rotation of one of the two shafts results in rotation of the other shaft by magnetic action without there being any direct mechanical connection between the shafts.

My prior patent also discloses the concept of having two magnet rotors rather than a single magnet rotor unit, with each magnet rotor having a respective set of permanent magnets spaced by an air gap from one of the electroconductive elements presented by the conductor rotors. The two magnet rotors are axially moveable relative to one another and are spring biased apart. By the present invention the magnet rotors are positively positioned relative to each other such as to vary their axial positions automatically at will from a remote control location to provide by air gap adjustment a variable torque from a constant speed motor to a variable torque load operating at a lower constantly maintained speed.

Instead of spring biasing the two magnet rotors as discussed above, in accordance with the present invention the positions of the magnet rotors are controlled from a stationary control mechanism which communicates with an adjusting mechanism operating on the magnet rotors to selectively move them toward one another to widen the air gaps or to move them further apart to narrow the air gaps. Gap adjustment varies the rotational slip between the magnet rotor units and the conductor rotor units for a given torque load and hence effects the speed of the load. For a given torque load the air gaps can be adjusted to provide the torque at a preset rotational speed differential below the speed of the motor. Assuming that the torque output of the motor at the established operating speed of the motor is adequate relative to the load, it has been found that since the power output of the motor adjusts automatically to the power requirement of the load there are substantial energy savings. Furthermore, by the present invention, the normal speed differential (slip) between the magnet rotors and conductor rotors does not result in overheating.

The adjusting means of the present invention takes, for example, two forms, (1) one of the magnet rotors is moved axially as, for example, by a reversible servo motor or shuttle of a piston connected to a push-pull member acting on the rotor, and the other magnet rotor is responsively caused to move axially a like amount response to a mechanism operating between the magnet rotors, and (2) both magnet rotors are adjusted axially by push-pull elements connected to a pair of axially spaced control rotors which are moved apart or toward one another as by a reversible servo motor having its output shaft formed with threaded sections of opposite hand which are screwed through the rotors.

DETAILED DESCRIPTION OF THE INVENTION

Figure 1:
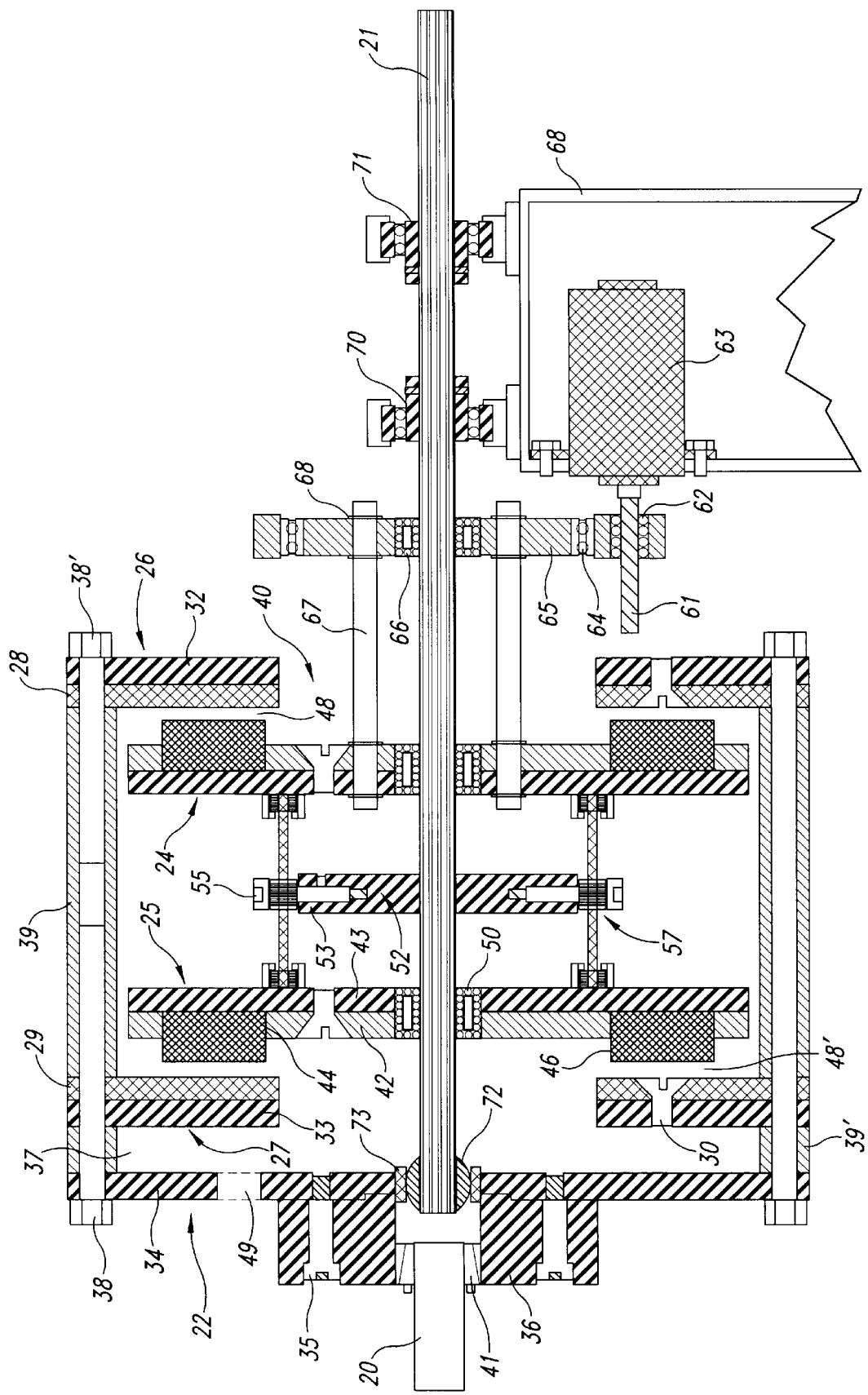
FIG. 1 is a longitudinal sectional view of a first embodiment of the invention shown in a narrow air gap position.

Referring to the drawings, coaxial input and output shafts 20–21 have mounted thereon a conductor rotor unit 22 and a pair of magnet rotors 24–25. The conductor rotor unit has two axially spaced conductor rotors 26–27 having respective conductor rings 28–29 facing toward one another and formed from a non-ferrous material with high electrical conductivity such as copper. These conductor rings 28–29 are mounted as by bolts 30 on respective backing rings 32–33 which preferably are mild steel. The conductor rotor unit 22 also includes a rotor disc 34 mounted by bolts 35 on a hub 36 and spaced axially from the conductor rotor 27 by a ventilation gap 37. The conductor rotors 26–27 are connected together and to the disc 34 in axially spaced relation by sets of bolts 38–38' threaded into spacer sleeves 39–39' located outwardly of the orbits of the magnet rotors 24–25. Conductor rotor 26 is separated from the output shaft 21 by an annular clearance space 40. The hub 36 is mounted on input shaft 20 as by a wedge-type coupling 41 or a key connection.

Each of the magnet rotors 24–25 has a non-ferrous mounting disc 42 backed by a ferrous backing disc 43, preferably of mild steel. The mounting discs 42 may be aluminum or a suitable non-magnetic composite, and each is formed with a set of equally spaced rectangular cutouts 44 arranged in circle and receiving a respective set of permanent magnets 46 seated against the respective backing disc 43. Adjacent magnets have their polarities reversed. The magnets 46 are spaced by air gaps 48–48' from the conductor rings 28–29 of the conductor rotor unit 22.

Figure 9:
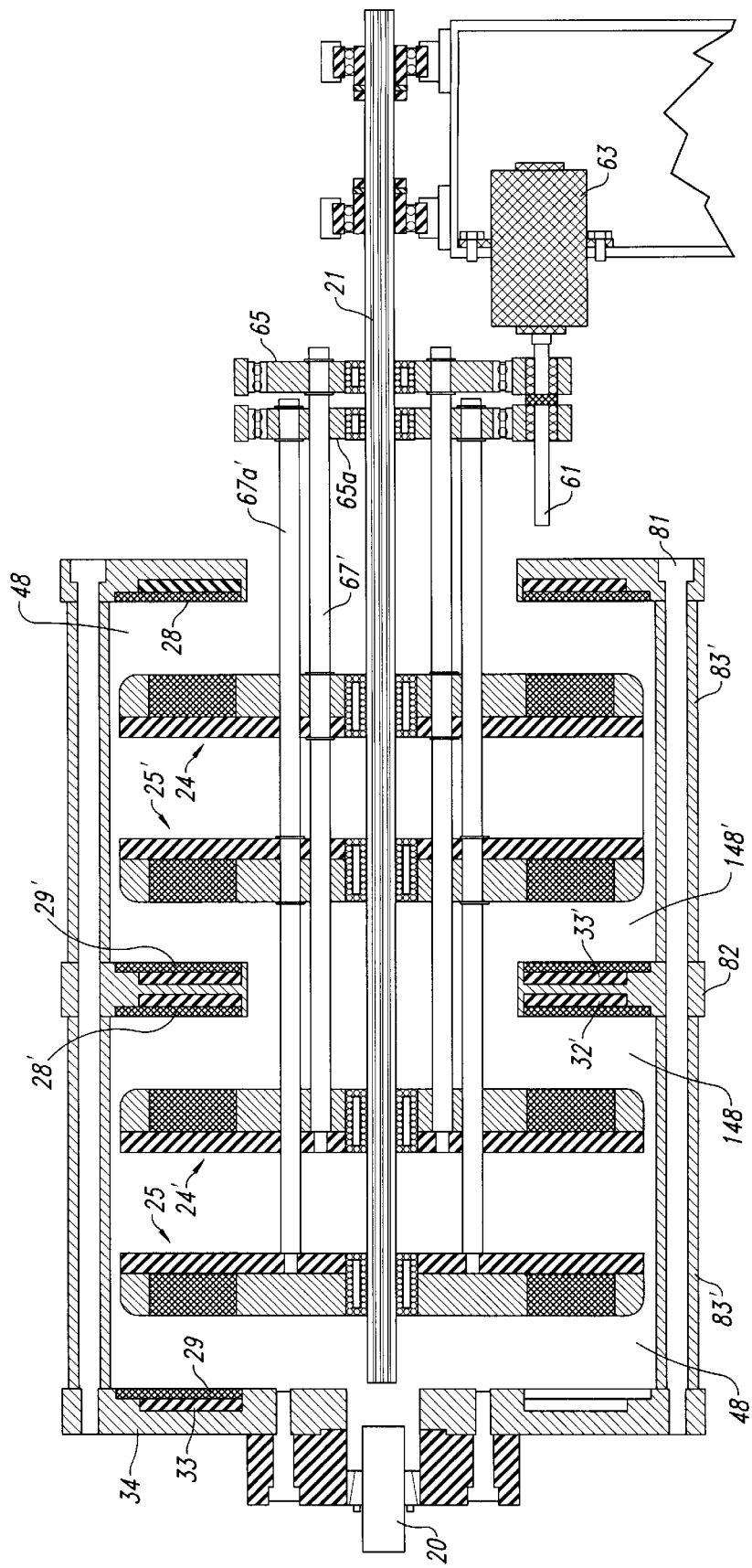
FIG. 9 corresponds to FIG. 7 and shows a tandem rotor configuration.

Preferably the disc 34 is formed with ventilation holes 49 communicating with the ventilation gap 37 to assist in the circulation of air through the air gap 48 for cooling the conductor ring 29. Cooling air for the conductor ring 28 is free to enter the air gap 48 from the clearance space 40. It is preferred to have the magnets 46 project part way from the mounting discs 42 to increase the space for air flow past the conductor rings 28–29 and to cause turbulence of the circulating air. It is to be understood that providing added ventilation for cooling of the conductor ring 29 by way of the ventilation space 37 and/or ventilation holes 49 may not be required for all applications in which case the backing ring would be mounted on the disc 34, as shown in FIG. 9, or the conductor ring 29 could be mounted directly on the disc 34 which thereupon could serve as the ferrous backing for the conductor ring 29 rather than the backing ring 30.

Figure 6:
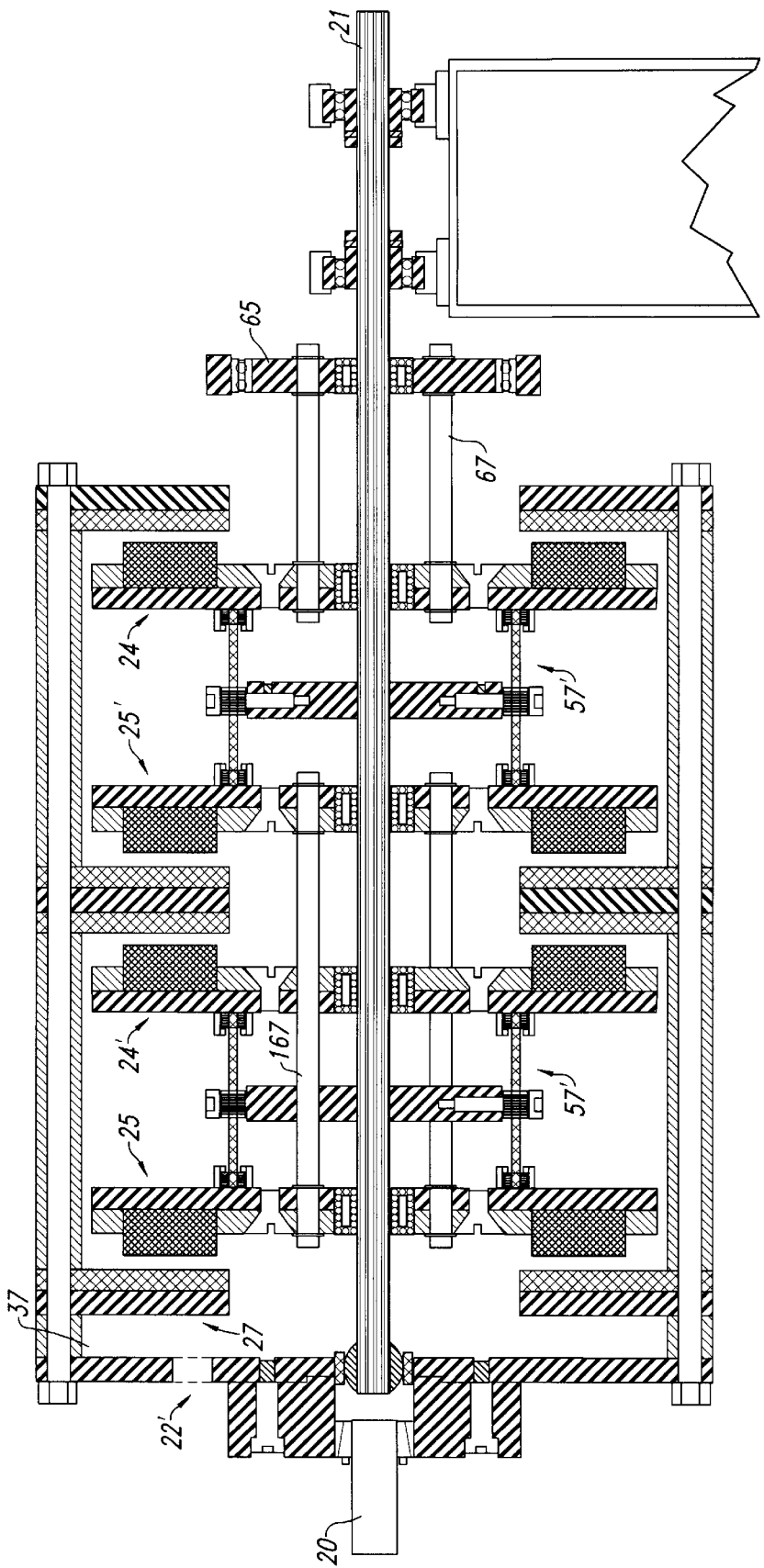
FIG. 6 is a longitudinal sectional view corresponding to FIG. 1 and showing a tandem rotor configuration.
Figure 7:
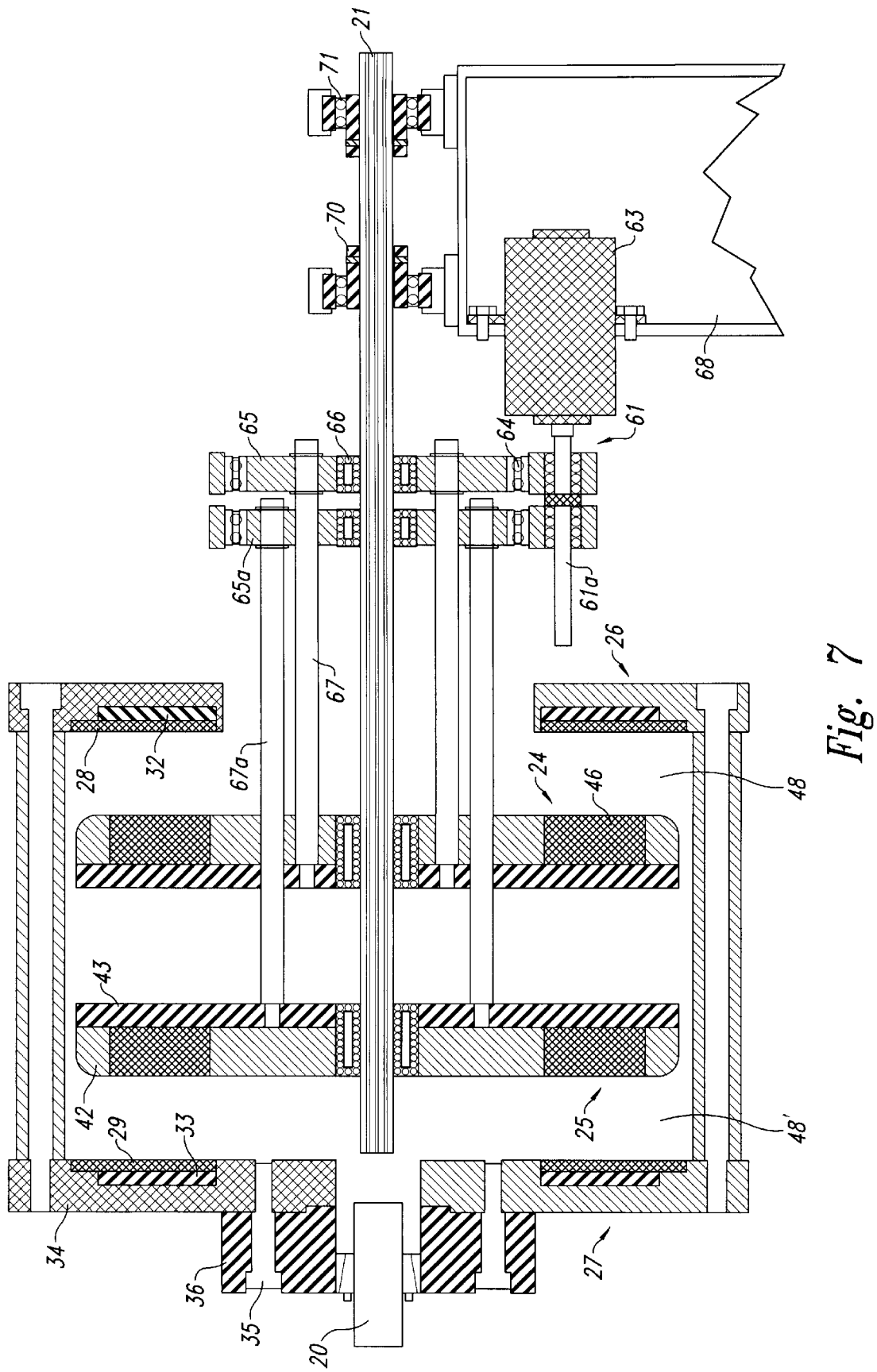
FIG. 7 is a longitudinal sectional view of an additional embodiment shown in a wide air gap position.

In accordance with the present invention the magnet rotors 24–25 are mounted so as to rotate in unison with the output shaft 21 and also be axially moveable relative to one another in opposite axial directions for adjustment of the air gaps 48–48'. To this end the output shaft 21 is splined and the magnet rotors 24–25 are mounted on the splines by way of linear ball bearing units 50 of the type having ball bearings circulating in the valleys between the splines. Such a unit is best seen in FIGS. 6–7 as unit 50'.

Push-pull means is provide to move the magnet rotors in unison along the splined output shaft 21 in opposite directions to vary the width of the air gaps 48–48'. In a first embodiment of the invention (FIG. 1) the push-pull means involves a first mechanism extending through the clearance spacer 40 for axially moving the magnet rotor 24, and a second mechanism extending between the magnet rotors for moving the magnet rotor 25 responsive to movement at the magnet rotor 24 by the first mechanism. The second mechanism includes a fifth rotor 52 which has spoke arms 53 and is fixed as by setscrews 54 to the output shaft 21 so as to be midway between the conductor rotors 26–27. The spoke arms 53 are formed with threaded radial bores extending toward the shaft 21 from their outer ends to receive shoulder bolts 55 on which needle bearings 56 are sleeved. These bearings receive center hubs 57a of rocker units 57 having a pair of rocker arms 57b with cross-pins 58 projecting laterally adjacent their outer ends. Journal-mounted on each of the cross-pins 58 at opposite sides of the respective rocker arm are a pair of rollers 59–59' which are confined by linear track units 60 mounted on the opposing inner faces of the backing members 43 on the magnet rotors. The track units 60 each have two complementing sections 60a–60b of a generally zee-shaped cross-section which are spaced laterally apart at their opposing inner edges for passage of a rocker arm 57b and confine the rollers 59–59' against separating from the magnet rotors during rocking of the rocker arm units 56, but permit the rollers 59–59' to roll along the back face of the magnet rotors on a line which, when extended, is perpendicular to a radius of the respective magnet rotor that corresponds in position on the magnet rotor to the position of the spoke arms 53 on the fifth rotor 52.

Figure 2:
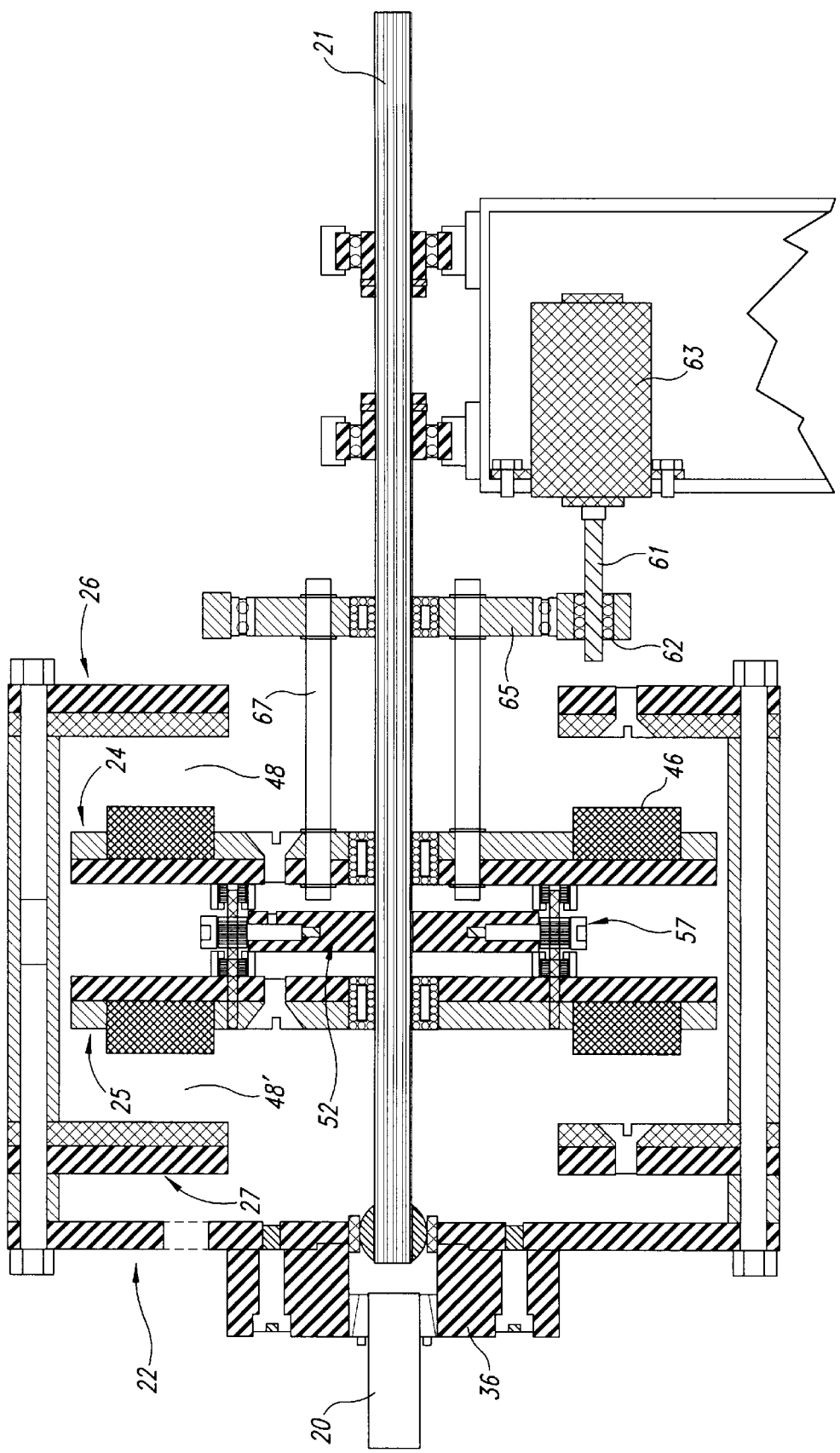
FIG. 2 shows the first embodiment in a wide air gap position.
Figure 3:
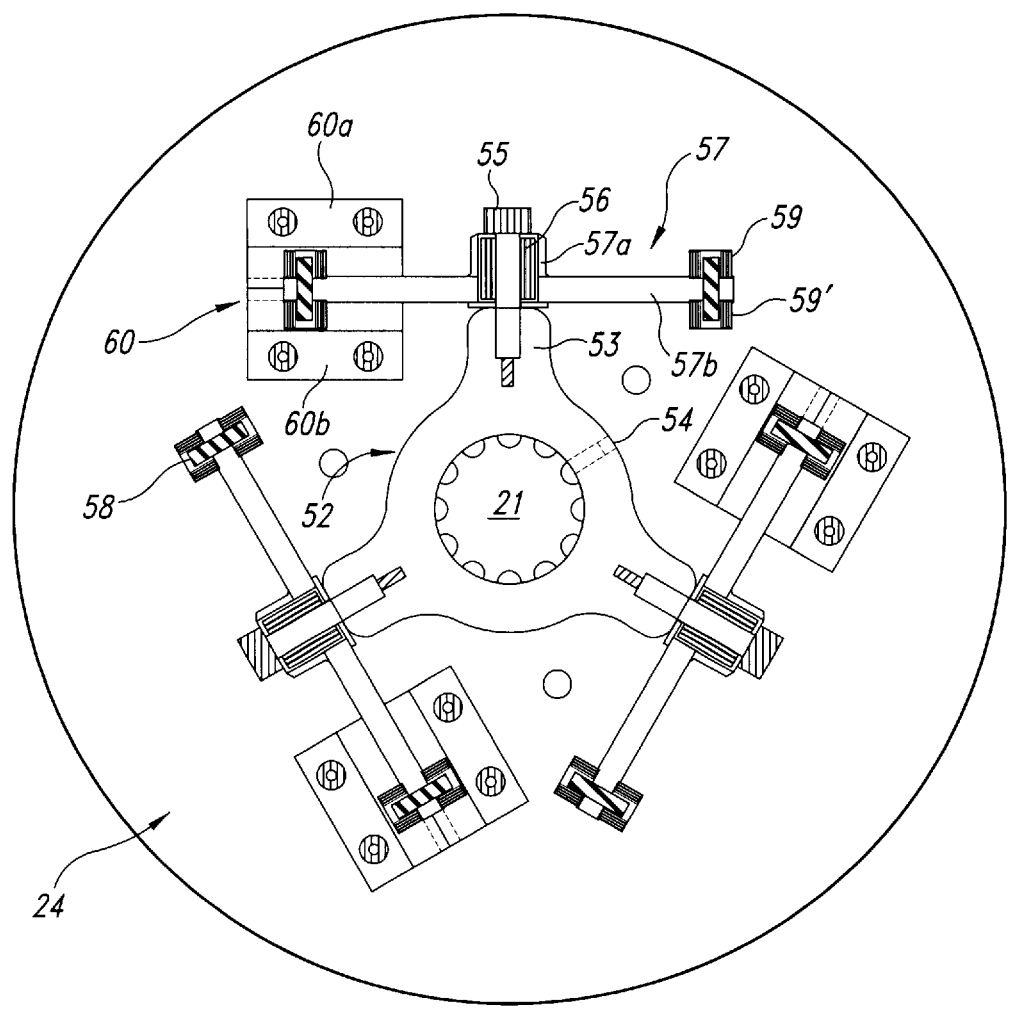
FIG. 3 is an elevational view showing the fifth rotor and related rocker arm units partly in section.

With the described rocker arm and track arrangement it is apparent that when the magnet rotor 24 is pushed away from the conductor rotor 26 to increase the width of the air gap 48, the rocket arms units 57 will responsively pivot on the bolts 55 so that their ends will swing toward the fifth rotor 52 as shown in FIG. 2. During this swinging movement the rollers 59–59' move linearly relative to the backing members 43 of the magnet rotors 24–25 and as a result the magnet rotor 25 is pulled toward the fifth rotor 52, thereby increasing the width of the air gap 48' to the same extent as the width of the air gap 48 is increased. Likewise, when the magnet rotor 24 is pulled toward the conductor rotor 26 to narrow the width of the air gap 48, the rocker arm units 57 will responsively pivot on the bolts 55 so that their ends will swing away from the fifth rotor 52, thereby causing the magnet rotor 25 to be pushed toward the conductor rotor 27 and narrow the air gap 48' in correspondence with the narrowing of the air gap 48 as shown in FIG. 1.

Pushing and pulling of the magnet rotor 24 to vary the width of the air gaps 48–48' is preferably accomplished by using a stationary reversible servo motor 63 which has its output shaft 61 threaded to coact with a ball type nut 62 so that operation of the servo motor causes axial movement of the ball nut. The latter is mounted on the outer race of a thrust bearing 64 having its inner race mounted on the periphery of an axially moveable control rotor 65. This control rotor 65 is mounted on the splined output shaft 21 as by a ball spline nut 66 so that the control rotor rotates with the output shaft 21 and is free to move axially relative to the output shaft. Three equally spaced push-pull rods 67 extend through the clearance opening 40 and through registering axial openings in the control rotor 65 and magnet rotor 24. Pairs of C-rings 68 fit into annular grooves in the push-pull rods 67 on opposite sides of control rotor 65 and magnet rotor 24 to connect these rotors to the push-pull rods so that as the control rotor moves axially responsive to operation of the servo motor 60 this axial motion is transferred to the magnet rotor 24.

The servo motor 63 is preferably mounted on a pedestal 68 together with a pair of thrust bearings 70–71 for supporting the output shaft 21. Since the portion of the output shaft which cantilevers axially toward the input shaft 20 from the bearings 70–71 carries the load of the magnet rotors 24–25 and the related adjustment mechanism, it is preferred to provide the cantilevering end of the output shaft with a ball 72 which fits within a bushing 73 press-fitted into the center bore of the disc 34 and hub 36 of the conductor unit 22. This arrangement permits misalignment between the shafts 20–21 while lending support to the output shaft 21 from the bearings (not shown) supporting the input shaft 20. For balance, a second servo motor and related drive connection to the control rotor 65 may be provided on the opposite side of the control rotor from the servo motor 63.

The servo motor 63 may be electrically connected to a controller having the rotational speed of the output shaft 20 as an input. The controller is set for a desired output speed and causes the servo motor to operate in a direction and degree of rotation such as to maintain the set speed by adjustment of the air gaps 48–48'. When the width of the air gaps is increased the slip between the magnet rotors 26–27 and conductor rotor unit 22 is increased, thereby lowering the speed of the output shaft. Narrowing of the air gaps decreases the slip, thereby increasing the speed of the output shaft.

Figure 4:
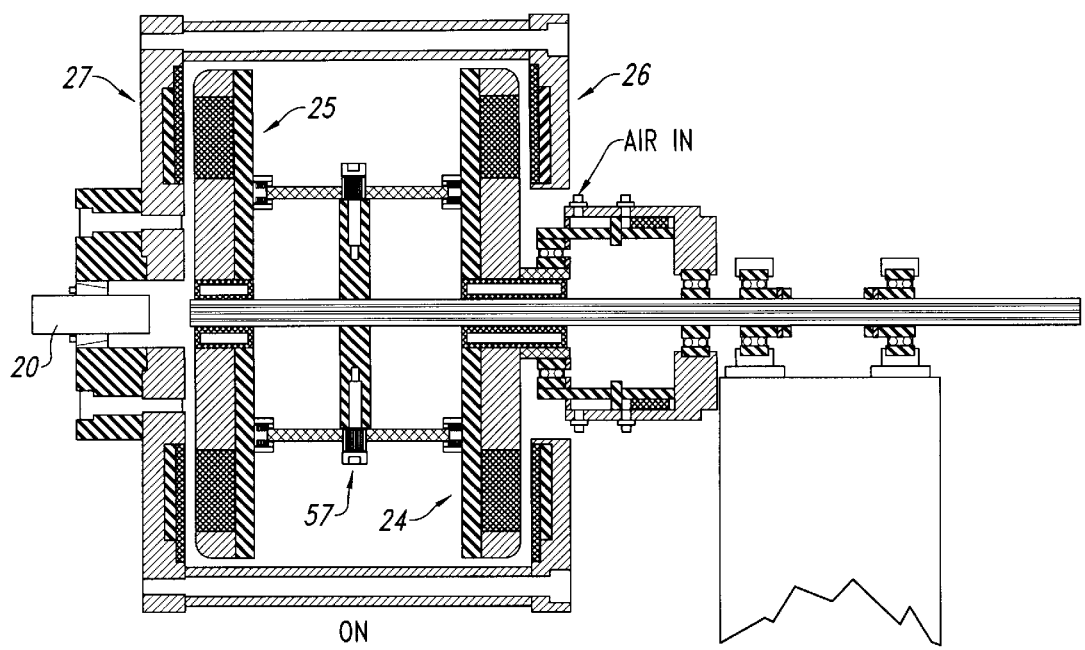
FIG. 4 is a longitudinal sectional view of a second embodiment in a narrow air gap position.
Figure 4A:
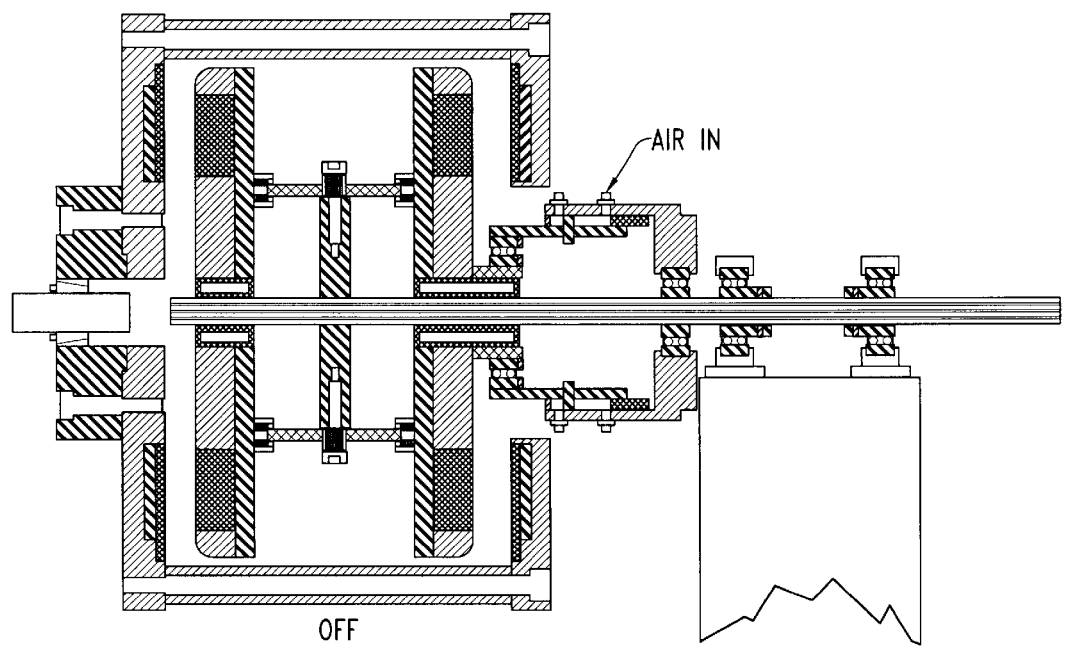
FIG. 4a shows the second embodiment in a wide air gap position.
Figure 5:
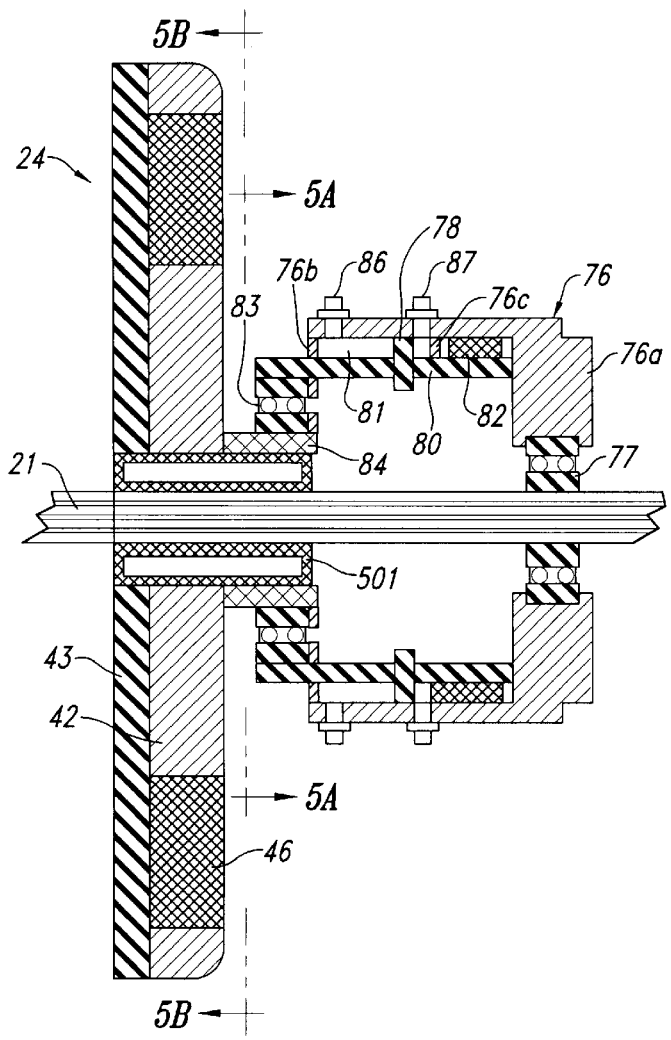
FIG. 5 is a longitudinal sectional view of a control portion of the second embodiment.
Figure 5A:
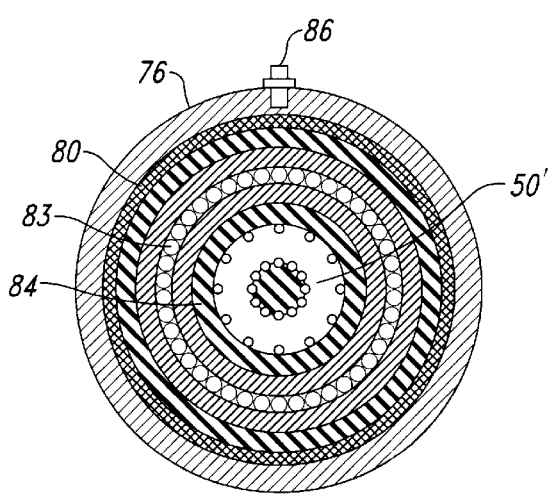
FIG. 5a is a transverse sectional view taken as indicted by indicator 5a in FIG. 5.
Figure 5B:
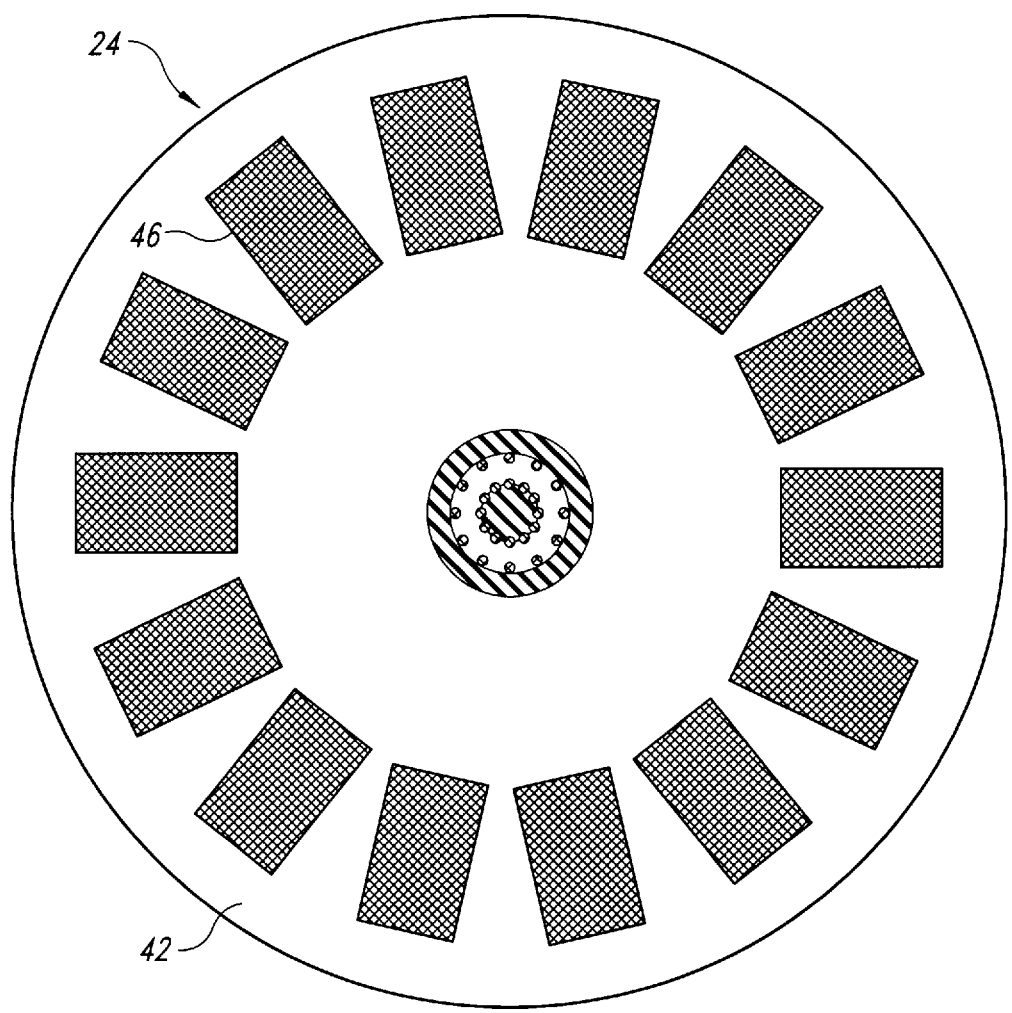
FIG. 5b is a transverse sectional view taken as indicted by indicator 5b in FIG. 5.

Referring to FIGS. 4–5, as an alternative, to use of a servo motor, the axial positioning of the magnet rotor 24 may be accomplished by use of a pneumatic system having a stationary outer cylinder 76 surrounding the output shaft 21 and journal-mounted thereon by a bearing 77 in a hub portion 76a of the cylinder. Fitting within the outer cylinder 76 is a double-acting annular piston 78 projecting radially outward from an inner cylinder 80 acting as a piston rod and together with inner annular lands 76b–76c defining an annular chamber 81 in which the piston 78 operates. The chamber 81 is sealed at its ends by suitable O-rings on the lands 76b–76c. An oil-lite bushing 82 is positioned between the cylinders 76, 80.

The inner cylinder 80 is mounted on the outer race of a thrust bearing 83 which has its inner race mounted on a cylindrical push-pull member 84 mounted as a hub on the magnet rotor 24. An elongated ball spline unit 50' extending into the push-pull member 84 is used to mount the magnet rotor on the output shaft 21 for axial movement. Combination air supply and exhaust ports 86–87 are provided in the outer cylinder 76 at the opposite ends of the chamber 81 and are fitted with air lines from a suitable control system which may include, for example, a 4-way control valve connected to a supply of compressed air. This valve may be shuttled automatically by a suitable controller to maintain the piston in a position corresponding to the air gap providing the desired preset output speed. As shown in FIG. 5, when the piston rod 80 is extended by pressurizing through port 87 and exhausting through port 86, the magnet rotors move toward one another and widen the air gaps. Similarly, when the piston rod 80 is retracted by pressurizing through port 86 and exhausting through port 87 as indicated in FIG. 4, the magnet rotors move apart and narrow the air gaps.

Figure 8:
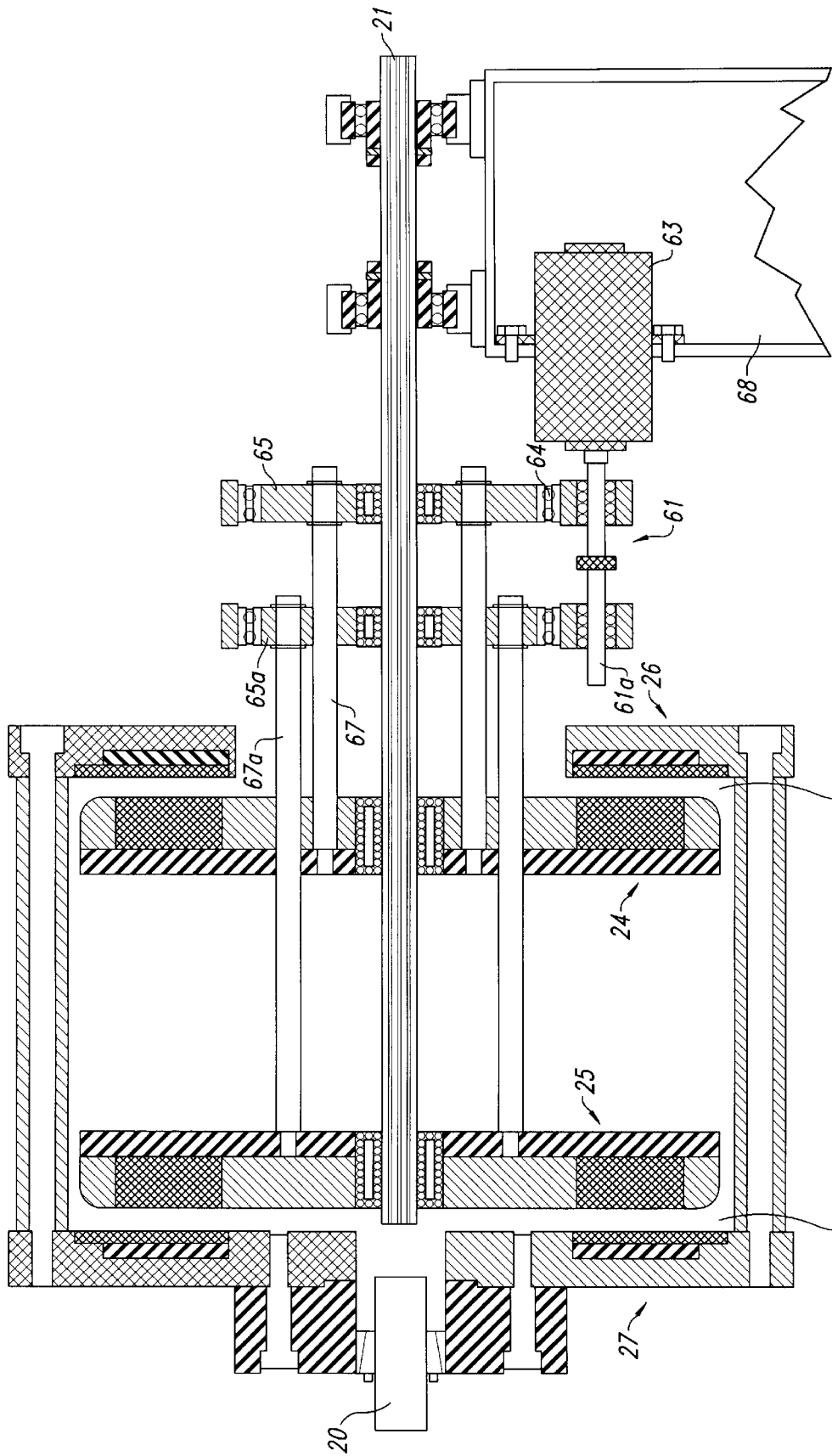
FIG. 8 shows the embodiment of FIG. 7 in a narrow air gap position.

As an alternative to utilizing the previously described rocker arm mechanism between the magnet rotors 24–25 to move them in unison in opposite axial directions, a push-pull rod mechanism can be used as shown in FIGS. 7 and 8. In this arrangement the magnet rotor 24 is positioned by use of a servo motor 63, control rotor 65, and a set of push-pull rods 67 as previously described with respect to FIG. 1. A second control rotor 65a is provided between the control rotor 65 and the conductor rotor unit 22 and is mounted on the output shaft 21 in the same way as the control rotor 65. Extending from this second control rotor are a second set of three push-pull rods 67a which pass freely through openings in the magnet rotor 24 and connect to the magnet rotor 25. The output shaft 61 of the servo motor 60 is extended to provide an outer section 61a have threads which are reversed in hand relative to the threads on the inner section. The second control rotor 65a is interconnected with the shaft extension 61a in the same manner as the first control rotor 65 is connected to inner section of the servo motor shaft. With the described arrangement, operation of the servo motor causes the control rotors 65, 65a to move axially on the shaft in opposite directions. This endwise movement of the control rotors is duplicated by the magnet rotors 24–25 by way of the two sets of push-pull rods 67, 67a. One direction of rotation of the servo motor 63 causes the control rotors 65–65a to move toward one another (FIG. 7) and responsively move the magnet rotors toward one another to widen the air gaps. The opposite direction of rotation of the servo motor separates the control rotors 65–65a (FIG. 8) and thereby causes the magnet rotors to move apart and narrow the air gaps.

For some applications of the invention, there is a need to provide the required torque transfer from the input shaft 20 to the output shaft 21 using rotors with a smaller diameter than possible with single pairs of magnet rotors and conductor rotors. As shown in FIG. 9, this need is satisfied by providing a second pair of magnet rotors 24'–25' on the output shaft and by extending the conductor rotor unit to present an additional conductor rotor 80 located between the two pairs of magnet rotors. This central conductor rotor is provided with two central conductor rings 28'–29' facing toward the conductor rings 29 and 28, respectively, and separated by air gaps 148, 148' from the magnet rotors 24', 25'. The central conductor rings 28'–29 are mounted on ferrous backing rings 32'–33' in turn mounted on opposite sides of a carrier ring 82 through which elongated mounting bolts 81 extend from the other conductor rotors. Spacer sleeves 83, 83' properly locate the central conductor rotor midway between the other two conductor rotors.

The push-pull rods 67 from the control rotor 65 are extended beyond the magnet rotor 24 to pass freely through magnet rotor 25' to connect with magnet rotor 24 and are designated 67'. Rods 67a' extend from the control rotor 65a, pass freely through the magnet rotor 24, are confined by C-rings relative to magnet rotor 25' where they pass through this rotor, and make connection with magnet rotor 25 at their outer end. With this push-pull rod arrangement axial motion of control rotor 65 is replicated by magnet rotors 24 and 24', and axial motion of the other control rotor 65a is replicated by magnet rotors 25 and 25'. Hence, operation of the servo motor 63 such as to spread apart the control rotors 65, 65a results in narrowing of the air gaps 48, 48' and 148, 148', thereby decreasing the slip between the magnet rotors and the conductor rotors. Likewise, operation of the servo motor in the reverse rotational direction so as to move the control rotors 65, 65a toward one another, results in widening of the air gaps 48, 48' and 148, 148', thereby increasing the slip between the magnet rotors and the conductor rotors.

As an alternative to the arrangement shown in FIG. 9, a second rocker assembly 57' like 57 in the FIG. 1 embodiment can be provided as shown in FIG. 8. In this figure the additional magnet rotors and additional conductor rings with their backing rings on the additional central conductor rotor 80, have been numbered as in FIG. 9. The adjustable coupling embodiment of FIG. 6 also includes an additional set of push pull-rod 167 connecting magnet rotors 25 and 25' and passing freely through magnet rotor 24' and additional fifth rotor 52' so as to cause both rocker assemblies to act in unison. Instead of providing the additional push rods 167, it will be apparent that the same result may be achieved by extending the rods 67 to pass freely through the fifth rotor 52 and magnet rotor 25' and then connect to magnet rotor 24'.

Although it is preferred to have the conductor rotor unit mounted on the input shaft for maximum cooling of its conductor elements, and to have the magnet rotors as the axially adjustable units, it will be appreciated that the magnets and conductor rings can be reversed in position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An adjustable magnetic coupler comprising:

first and second rotary shafts having a rotary axis;

two magnet rotors each containing a respective set of permanent magnets;

two conductor rotors each having an electroconductive ring spaced axially by an air gap from a respective one of said sets of magnets;

two of said rotors being spaced apart a fixed axial distance and being mounted as a unit on said first shaft to rotate in unison therewith;

the remaining two of said rotors being mounted in concentric relation to said second shaft to be moved axially with respect thereto and to rotate in unison therewith; and a mechanism connected to said remaining rotors and operative to selectively move them axially in unison in opposite directions to vary said air gaps equally.

2. An adjustable magnetic coupler according to claim 1 in which one of said rotors in said unit is spaced radially by a clearance from said second shaft and said mechanism includes first and second parallel push-pull members extending through said clearance space and connected to said remaining rotors.

3. An adjustable magnetic coupler according to claim 2 in which said first push-pull member extends through said clearance space to a first of said remaining rotors, and in which said second push-pull member extends through said clearance space and passes freely through said first remaining rotor to the second of said remaining rotors.

4. An adjustable magnetic coupler according to claim 1 in which both of said rotors in said unit are conductor rotors;

and said remaining rotors are both magnet rotors located between said conductor rotors;

and in which said mechanism is operative to selectively move said magnet rotors axially in unison in opposite directions a selected distance to vary the air gaps equally between said conductor rotors and magnet rotors.

5. An adjustable magnetic coupler comprising:

first and second rotary shafts having a rotary axis;

a group of two axially-spaced magnet rotors each containing a respective set of magnets;

a group of two axially-spaced conductor rotors each having a nonferrous electroconductive ring spaced by an air gap from a respective one of said sets of magnets;

the distance between the rotors of said groups being fixed, and such group being mounted on said first shaft to rotate in unison therewith;

the rotors of the second of being in concentric relation to said second shaft to be moveable axially relative to one another along said rotary axis and to rotate together in unison therewith; and a push-pull mechanism operative for axially moving a first rotor in said second group of rotors a selected distance in a selected axial direction and for axially moving the second rotor in said second group of rotors an amount equal to said selected distance, but in an axial direction opposite to said selected axial direction, whereby said air gaps are varied equally.

6. A coupler according to claim 5 in which said mechanism includes a non-rotating push-pull device, and includes a thrust bearing assembly having a non-rotary element connected to said push-pull device for selective axial movement and having a rotary element which is connected to said first rotor in said second group of rotors, whereby linear movement of said push-pull device is transferred to like linear movement of said first rotor in said second group of rotors.

7. An adjustable magnetic coupler comprising:

first and second shafts having coaxial rotary axes;

a group of two axially-spaced magnet rotors each containing a respective set of permanent magnets;

a group of two axially-spaced conductor rotors each having a nonferrous electroconductive ring spaced by an air gap from a respective one of said sets of magnets;

the distance between the rotors of one of said groups being fixed, and such group having a first of its rotors mounted on said first shaft to rotate in unison therewith, and having the second of its rotors surrounding said second shaft and radially spaced therefrom by a clearance space;

the rotors of the second of said groups being mounted so as to be moveable axially relative to one another along the rotary axis of said second shaft and to rotate together in unison with said second shaft;

and air gap adjustment means connected to the rotors of the second said group for selectively axially moving them relative to one another a selected distance in opposite axial directions whereby said air gaps may be varied equally.

8. An adjustable magnetic coupler according to claim 7 in which the rotors of said one of said groups are conductor rotors each having its electroconductive ring engaged by a respective ferrous backing member; and in which the rotors of said second of said groups are magnet rotors, each having adjacent magnets of its set of permanent magnets arranged with their poles reversed, each said set being mounted in a respective carrier disc including a respective ferrous backing member engaged by the magnets of such set.

9. An adjustable magnetic coupler according to claim 7 in which said air gap adjustment means includes a first mechanism for selectively moving a first rotor in said second group axially a selected distance and selected direction, and includes a second mechanism located between the rotors of said second group for moving the second rotor in said second group axially said selected distance in a direction opposite to said selected direction responsive to movement of said first rotor in said second group by said first mechanism.

10. An adjustable magnetic coupler according to claim 7 in which said air gap adjustment means includes a push-pull element passing through said clearance space.

11. An adjustable magnetic coupler comprising:

first and second shafts having coaxial rotary axes;

a conductor rotor unit mounted on said first shaft to rotate in unison therewith and providing axially aligned first and second groups of electroconductive elements, each such group having two respective electroconductive elements facing one another and axially spaced apart;

first and second groups of axially-spaced magnet rotors, each such group of magnet rotors having two magnet rotors and each magnet rotor containing a respective set of permanent magnets;

each of the magnet rotors in said two groups of magnet rotors being mounted so as to be moveable axially relative to the other magnet rotors along the rotary axis of said second shaft and to rotate together in unison with said second shaft;

said first group of magnet rotors being located between said first group of electroconductive elements and having their sets of permanent magnets spaced by a first pair of air gaps from said electroconductive elements in such first group of electroconductive elements;

said second group of magnet rotors being located between said second group of electroconductive elements and having their sets of permanent magnets spaced by a second pair of air gaps from said electroconductive elements in such second group of electroconductive elements;

and an air gap adjustment mechanism connected to said first and second groups of magnet rotors and operative to axially move the respective magnet rotors in each of said groups axially relative to one another a selected distance in opposite axial directions whereby said first and second pairs of air gaps are varied equally.

12. An adjustable magnetic coupler comprising:

first and second shafts having coaxial rotary axes;

a conductor rotor unit mounted on said first shaft to rotate in unison therewith and providing axially-aligned first and second groups of electroconductive elements, each such group having two respective electroconductive elements facing one another and axially spaced apart;

first and second groups of axially-spaced magnet rotors, each such group of magnet rotors having two magnet rotors and each magnet rotor containing a respective set of permanent magnets;

each of the magnet rotors in said two groups of magnet rotors being mounted so as to be moveable axially relative to the other magnet rotors along the rotary axis of said second shaft and to rotate together in unison with said second shaft;

said first group of magnet rotors being located between said first group of electroconductive elements and having their sets of permanent magnets spaced by a first pair of air gaps from said electroconductive elements in such first group of electroconductive elements;

said second group of magnet rotors being located between said second group of electroconductive elements and having their sets of permanent magnets spaced by a second pair of air gaps from said electroconductive elements in such second group of electroconductive elements;

a first air gap adjustment mechanism connected to said first group of magnet rotors and operative to axially move them relative to one another a selected distance in opposite axially directions whereby said first pair of air gaps may be varied equally;

and a second air gap adjustment mechanism interconnecting said first and second groups of magnet rotors and operative to axially move said second group of magnet rotors in unison with said first group of magnet rotors whereby said second pair of air gaps may also be varied equally responsive to operation of said first air gap adjustment mechanism.

* * * * *